United States Patent
Pan et al.

(10) Patent No.: US 8,213,493 B2
(45) Date of Patent: *Jul. 3, 2012

(54) PILOT-DIRECTED AND PILOT/DATA-DIRECTED EQUALIZERS

(75) Inventors: Jung-Lin Pan, Smithtown, NY (US); Mihaela C. Beluri, Huntington, NY (US); Philip J. Pietraski, Huntington Station, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 567 days.

This patent is subject to a terminal disclaimer.

(21) Appl. No.: 12/415,023

(22) Filed: Mar. 31, 2009

(65) Prior Publication Data
US 2009/0180528 A1 Jul. 16, 2009

Related U.S. Application Data

(63) Continuation of application No. 11/256,047, filed on Oct. 21, 2005.

(60) Provisional application No. 60/625,630, filed on Nov. 5, 2004.

(51) Int. Cl.
H03H 7/30 (2006.01)
(52) U.S. Cl. ........ 375/232; 375/229; 375/344; 375/148; 375/222; 370/335; 370/503
(58) Field of Classification Search .................. 375/229, 375/232, 344, 148; 370/335, 503
See application file for complete search history.

(56) References Cited

U.S. PATENT DOCUMENTS

| | | | |
|---|---|---|---|
| 5,666,378 A * | 9/1997 | Marchetto et al. ............ | 375/222 |
| 6,175,588 B1 | 1/2001 | Visotsky et al. | |
| 6,215,354 B1 | 4/2001 | Kolanek et al. | |
| 6,628,781 B1 * | 9/2003 | Grundstrom et al. .... | 379/406.14 |
| 6,658,047 B1 | 12/2003 | Komulainen et al. | |
| 6,687,315 B2 | 2/2004 | Keevil et al. | |
| 6,798,832 B1 | 9/2004 | Nakata et al. | |
| 6,856,648 B1 | 2/2005 | Hyll | |
| 7,023,265 B1 | 4/2006 | Helard et al. | |
| 7,082,159 B2 | 7/2006 | Larsson | |
| 7,362,802 B2 | 4/2008 | Saed | |
| 7,406,122 B2 | 7/2008 | Shimobayashi et al. | |
| 2002/0191568 A1 | 12/2002 | Ghosh | |
| 2003/0066088 A1 | 4/2003 | Jung | |
| 2003/0210646 A1 | 11/2003 | Ohseki et al. | |
| 2004/0213340 A1 | 10/2004 | Kuribayashi | |
| 2005/0100052 A1 | 5/2005 | Mailaender et al. | |
| 2005/0286622 A1 * | 12/2005 | Kim et al. ..................... | 375/232 |
| 2006/0114974 A1 | 6/2006 | Zeira et al. | |
| 2009/0041094 A1 * | 2/2009 | Ishii ............................. | 375/148 |
| 2009/0129458 A1 * | 5/2009 | Pietraski et al. ............. | 375/232 |
| 2009/0290630 A1 * | 11/2009 | Pietraski et al. ............. | 375/232 |

FOREIGN PATENT DOCUMENTS

| | | |
|---|---|---|
| EP | 1441484 | 7/2004 |
| GB | 2346520 | 8/2002 |
| TW | I220350 | 8/2004 |
| WO | 02/080379 | 10/2002 |

* cited by examiner

*Primary Examiner* — Eva Puente
(74) *Attorney, Agent, or Firm* — Volpe and Koenig, P.C.

(57) ABSTRACT

A normalized least means square (NLMS) equalizer including two equalizer filters is disclosed. In one embodiment, a single correction term generator is used to generate correction terms for tap coefficient updates of each of the equalizer filters based on a pilot signal. In another embodiment, two different correction term generators are used to generate correction terms for each of the equalizer filters, whereby one of the correction term generators uses data received from a hard decision unit at the output of one of the equalizer filters to generate correction terms for both of the equalizer filters.

20 Claims, 2 Drawing Sheets

PILOT-DIRECTED AND PILOT/DATA-DIRECTED EQUALIZERS

CROSS REFERENCE TO RELATED APPLICATION

This application is a continuation of U.S. patent application Ser. No. 11/256,047, filed Oct. 21, 2005, which claims the benefit of U.S. Provisional Application No. 60/625,630, filed Nov. 5, 2004, which is incorporated by reference as if fully set forth.

FIELD OF THE INVENTION

The present invention relates to a normalized least means square (NLMS) equalizer used in a code division multiple access (CDMA) receiver. More particularly, the present invention relates to an equalizer including a plurality of equalizer filters which use pre-equalization despreading for reduced complexity of both the equalizer and the receiver.

BACKGROUND

Chip-level equalizers (CLE) are suitable candidates for CDMA receivers, such as those used in wireless transmit/receive units (WTRUs) and base stations. An NLMS-based CLE receiver offers superior performance for high data rate services such as high speed downlink packet access (HSDPA) over a Rake receiver. A typical NLMS receiver comprises an equalizer filter and an NLMS algorithm. The equalizer filter is typically a finite impulse response (FIR) filter.

The NLMS algorithm is used for tap-weights generation. It generates appropriate tap-weights used by the equalizer filter and updates them appropriately and iteratively in a timely basis. Typically, tap-weights generation includes error signal computation, vector norm calculation and leaky integration to generate and update the tap-weights.

The high complexity of the CLE is due to the over-sampling processing in the CLE. A typical process in the CLE equalizer includes filtering, tap-weight vector updating, vector norm square computing, or the like, which all operate at two or more times the chip rate. Two times the chip rate over-sampling processing induces twice as much complexity as the chip rate non-over-sampling processing in the equalizer filter.

Particularly, multiplications of a tap-input vector with tap-weights which are performed on a chip-by-chip basis are usually the component with major complexity and results in high complexity.

SUMMARY

The present invention is related to an NLMS equalizer including two equalizer filters. In one embodiment, a single correction term generator is used to generate correction terms for tap coefficient updates of each of the equalizer filters based on a pilot signal. In another embodiment, two different correction term generators are used to generate correction terms for each of the equalizer filters, whereby one of the correction term generators uses data received from a hard decision unit at the output of one of the equalizer filters to generate correction terms for both of the equalizer filters.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
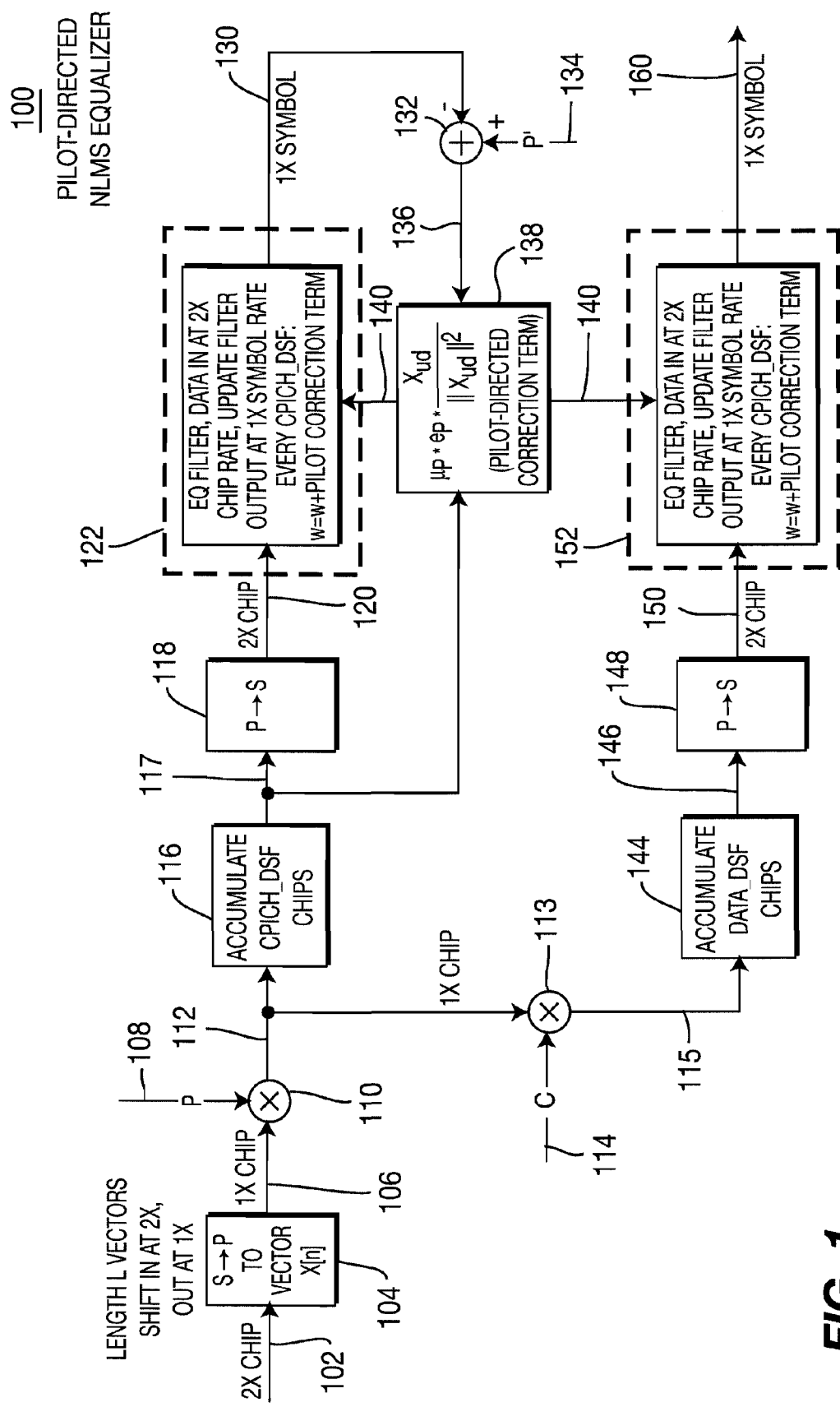
FIG. 1 is a block diagram of a pilot-directed equalizer in accordance with one embodiment of the present invention.

The preferred embodiments will be described with reference to the drawing figures where like numerals represent like elements throughout.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an integrated circuit (IC) or be configured in a circuit comprising a multitude of interconnecting components.

Hereafter, the present invention will be explained with reference to an NLMS algorithm. However, it should be noted that any type of adaptive equalization or filtering, such as least mean square (LMS), Griffith's algorithm, channel estimation based NLMS (CE-NLMS), and other iterative or recursive algorithms may be used.

In accordance with the present invention, despreading is performed on a sample data stream before being equalized by an equalizer filter, thus reducing the complexity of the equalizer filter and other components. Equations (1) and (2) present the mathematically equivalent models of equalization and despreading processes.

$$[c_1 \; c_2 \; \ldots \; c_{SF}] \begin{bmatrix} x_1 & x_2 & \ldots & x_L \\ x_2 & x_3 & \ldots & X_{L+1} \\ \vdots & & & \\ x_{SF} & x_{SF+1} & \ldots & x_{L+SF-1} \end{bmatrix} \begin{bmatrix} w_1 \\ w_2 \\ \vdots \\ w_L \end{bmatrix} = \quad \text{Equation (1)}$$

$$[c_1 \; c_2 \; \ldots \; c_{SF}] \begin{bmatrix} y_1 \\ y_2 \\ \vdots \\ y_{SF} \end{bmatrix};$$

$$[c_1 \; c_2 \; \ldots \; c_{SF}] \begin{bmatrix} x_1 & x_2 & \ldots & x_L \\ x_2 & x_3 & \ldots & X_{L+1} \\ \vdots & & & \\ x_{SF} & x_{SF+1} & \ldots & x_{L+SF-1} \end{bmatrix} \begin{bmatrix} w_1 \\ w_2 \\ \vdots \\ w_L \end{bmatrix} = \quad \text{Equation (2)}$$

$$[z_1 \; z_2 \; \ldots \; z_L] \begin{bmatrix} w_1 \\ w_2 \\ \vdots \\ w_L \end{bmatrix}.$$

SF denotes a spreading factor, L, denotes the number of tap-weights in the adaptive equalizer filter, $c_i$, i=1, 2, ..., SF denotes the i-th element of spreading code, $x_i$, i=1, 2, ..., L, ... denotes the tap-input vector and $w_i$, i=1, 2, ..., L denotes the i-th tap-weight. Furthermore, $y_i$, i=1, 2, ..., SF denotes the results of the multiplication of tap-input matrix and tap-weight vector, and $z_i$, i=1, 2, ..., L denotes the results of the despreading of the tap-input matrix with the spreading code. Equation (1) is mathematically equivalent to Equation (2).

In Equation (1), the tap-input matrix is first multiplied with a tap-weight vector. This results in vector $\vec{y}=[y_i]$, i=1, 2, . . . , SF as follows:

$$\begin{bmatrix} x_1 & x_2 & \ldots & x_L \\ x_2 & x_3 & \ldots & x_{L+1} \\ \vdots & & & \\ x_{SF} & x_{SF+1} & \ldots & x_{L+SF-1} \end{bmatrix} \begin{bmatrix} w_1 \\ w_2 \\ \vdots \\ w_L \end{bmatrix} = \begin{bmatrix} y_1 \\ y_2 \\ \vdots \\ y_{SF} \end{bmatrix}. \quad \text{Equation (3)}$$

Despreading is then followed to despread the vector $\vec{y}=[y_i]$, i=1, 2, . . . , SF such that:

$$output 1 = [c_1 \ c_2 \ \ldots \ c_{SF}] \begin{bmatrix} y_1 \\ y_2 \\ \vdots \\ y_{SF} \end{bmatrix}. \quad \text{Equation (4)}$$

The computation in Equations (3) and (4) requires SF×L complex multiplications and SF×L complex additions.

Equation (2) is a more efficient method to perform the equalization and despreading, which is utilized by the present invention. First, the tap-input matrix is despread with spreading code, which results in vector $\vec{z}=[z_i]$, i=1, 2, . . . , L as follows:

$$[c_1 \ c_2 \ \ldots \ c_{SF}] \begin{bmatrix} x_1 & x_2 & \ldots & x_L \\ x_2 & x_3 & \ldots & x_{L+1} \\ \vdots & & & \\ x_{SF} & x_{SF+1} & \ldots & x_{L+SF-1} \end{bmatrix} = [z_1 \ z_2 \ \ldots \ z_L]. \quad \text{Equation (5)}$$

The despread output is then multiplied with tap-weight vector as follows:

$$output 2 = [z_1 \ z_2 \ \ldots \ z_L] \begin{bmatrix} w_1 \\ w_2 \\ \vdots \\ w_L \end{bmatrix}. \quad \text{Equation (6)}$$

Output 2 is equal to output 1. Since the despreading of a tap-input vector with a spreading code results in only a sign change or a phase rotation, as shown in Equation (2), instead of the complex multiplication and addition functions performed in Equation (1), the complexity of Equation (2) is much less than the complexity in Equation (1). The computation of output 2 in Equations (5) and (6) requires only L complex multiplications and SF×L complex additions. The number of complex multiplications in Equation (2) is reduced by a factor of $$\frac{1}{SF}$$

from SF×L to L. In general, the computational complexity increases with the number of computations, especially multiplications. The present invention makes NLMS more efficient in terms of the number of computations.

FIG. 1 is a block diagram of a pilot-directed NLMS equalizer 100 in accordance with one embodiment of the present invention. The NLMS equalizer 100 includes a serial-to-parallel (S→P) to vector converter 104, multipliers 110, 113, chips accumulators 116, 144, parallel-to-serial (P→S) converters 118, 148, equalizer filters 122, 152, a summer 132 and a correction term generator 138.

Referring to FIG. 1, a two times (2×) chip rate sample data stream 102 is received by the S→P to vector converter 104. The S→P to vector converter 104 converts the sample data stream 102 to a one times (1×) chip rate converted parallel vectors signal 106 having a length L. The length L converted parallel vectors signal 106 is then multiplied with a scrambling code conjugate signal 108 ("P"), via the multiplier 110, to generate a descrambled parallel vectors signal 112. The descrambled parallel vectors signal 112 is input to the chips accumulator 116, which implements an accumulation operation over a proper period, CPICH_DSF chip duration, where CPICH_DSF represents the despreading factor (DSF) for a common pilot channel (CPICH). Simultaneously, the descrambled parallel vectors signal 112 is multiplied by the despreading code 114, ("C"), via the multiplier 113, to generate a despread descrambled parallel vector signal 115. The despread descrambled parallel vector signal 115 is input to the chips accumulator 144, which implements an accumulation operation over a proper period, DATA_DSF chips duration, where DATA_DSF represents the DSF for data.

The chips accumulator 116 accumulates the descrambled parallel vectors signal 112 to generate an accumulated parallel vectors signal 117, which is input to the P→S converter 118 and the correction term generator 138. The accumulated parallel vectors signal 117 is converted by the P→S converter 118 to an accumulated serial vectors signal 120, which is input to the equalizer filter 122.

The equalizer filter 122 generates an equalized signal 130 based in part on the accumulated serial vectors signal 120. The equalized signal 130 is then subtracted from a pilot symbol reference signal 134 by the summer 132 to generate an error signal 136 which is input to the correction term generator 138. The correction term generator 138 includes a vector norm square estimator (not shown) for generating a vector norm square of the accumulated parallel vectors signal 117 and for generating a pilot-directed correction term 140. The correction term generator 138 generates the pilot-directed correction term 140 based on the error signal 136 and the accumulated parallel vectors signal 117. The equalized signal 130 is further based on the pilot-directed correction term 140.

The chips accumulator 144 accumulates the despread descrambled parallel vector signal 115 to generate a despread descrambled parallel vector signal 146 which is input to the P→S converter 148. The despread descrambled parallel vector signal 146 is converted by the P→S converter 148 to a despread descrambled serial signal 150 which is input to the equalizer filter 152. The equalizer filter 152 outputs an equalized signal 160 based on the despread descrambled serial vector signal 150 and the pilot-directed correction term 140.

For multiple codes reception of data, the multiplier 113, the chips accumulator 144, the P→S converter 148 and the equalizer filter 152 may need to be run sequentially in serial for all codes. Alternatively, the multiple data processing branches for the multiplier 113, the chips accumulator 144, the P→S converter 148 and the equalizer filter 152 may also be simultaneously implemented in parallel.

In order for the correction term generator 138 to generate pilot-directed correction term 140 for tap coefficient updates of the respective equalizers 122, 152, the inputs for $\mu_p$, $e_p$ and $X_{ud}$ are required. $\mu_p$ is the step size. $e_p$ is the error signal which is the differential signal between an equalized signal and a reference signal, which typically is used in the form of a pilot signal. $X_{ud}$ is the received signal after descrambling and despreading. $\|X_{ud}\|$ is the norm of the descrambled and despread signal $X_{ud}$.

The pre-equalization despreading approach is applied to both pilot-directed or pilot/data-directed equalizers for reducing the complexity of the equalizers as previously described.

The present invention implements single receive antenna in conjunction with adaptive equalizers as described previously and shown in FIG. 1.

The present invention implements receive diversity in conjunction with an adaptive equalizer, which improves the receiver performance. In the case when receiver diversity is implemented, the input signal 102 is operating at 4× chip rate (i.e., 4×=2×times 2×, in which 2× chip rate accounts for over-sampling and the other 2× for receive antenna diversity). The S→P to vector converter 104 has signals shift in at 4× chip rate and output vectors at 1× chip rate. The signals 120 and 150 are operating at 2× chip rate. The equalizer filters 122, 152 are joint equalizer filters which have signals input at 2× chip rate and output at 1× symbol rate. A joint equalizer filter coefficient vector adaptation scheme in accordance with the present invention is described below.

A weight vector $\vec{w}_{n,jo\,int}$ is defined for the equalizer filter as a union of multiple component weight vectors. Each component weight vector corresponds to data collected by a different antenna. Any permutation of elements from component vectors may comprise the joint weight vector so long as the permutation properly reflects the order in which data enters the joint NLMS equalizer. As these are mathematically equivalent, the permutation may be chosen for notational convenience. For example, for two antennas, the joint weight vector $\vec{w}_{n,jo\,int}$ can be defined as follows:

$$\vec{w}_{njo\,int} = [\vec{w}_{n,1}^T, \vec{w}_{n,2}^T]^T \qquad \text{Equation (7)}$$

where $()^T$ denotes a transpose operation. The total number of taps of the equalizer filter is denoted by L. $\vec{w}_{n,jo\,int}$ is a column vector.

For the chosen notation in Equation (7), the notation for the joint update vector $\vec{x}_{n,jo\,int}$ is defined as follows:

$$\vec{x}_{njo\,int} = [\vec{x}_n^1, \vec{x}_n^2], \qquad \text{Equation (8)}$$

where $\vec{x}_n^1, \vec{x}_n^2$ are vectors based on the samples received from antenna 1 and antenna 2, respectively. $\vec{x}_{n,jo\,int}$ is a row vector.

The filter coefficient adaptation for the joint NLMS equalizer can then be processed in a usual way for an NLMS equalizer. For example, the updated coefficient vector can be obtained as follows:

$$\vec{w}_{n+1,joint} = \alpha \cdot \vec{w}_{n,joint} + \mu \frac{\vec{x}_{n,joint}^H}{\|\vec{x}_{n,joint}\|^2 + \varepsilon}(d[n] - \vec{x}_{n,joint}\vec{w}_{n,joint}), \qquad \text{Equation (9)}$$

where $()^H$ denotes a transpose conjugate operation, d[n] is the reference signal for NLMS and $\varepsilon$ is a small number used to prevent from dividing by zero. The parameter $\alpha$ is a weighting parameter and $\mu$ is a scale factor of error signal. The $\mu$ can be estimated based on the vehicle speed and signal-to-interference and noise ratio (SINR) and interpolated to obtain a continuous estimation.

For pilot-directed NLMS, d[n] can be a pilot signal, training signal, or other known pattern signals. The signals may be either despread signals with pre-determined despreading factors, or non-despread signals. Similarly, for data-directed NLMS, d[n] can be despread or non-despread data symbols.

The tap correction terms $\vec{\Delta}_{n,jo\,int}$ are computed as follows:

$$\vec{\Delta}_{n,joint} = \mu \frac{\vec{x}_{n,joint}^H}{\|\vec{x}_{n,joint}\|^2 + \varepsilon} \cdot e_{n,joint}, \qquad \text{Equation (10)}$$

where the factor $e_{n,jo\,int}$ is a joint error signal and is computed by subtracting the equalizer filter output from the reference signal d[n] as follows:

$$e_{n,jo\,int} = d[n] - \vec{x}_{n,jo\,int}\vec{w}_{n,jo\,int}. \qquad \text{Equation (11)}$$

In the case of no receiver diversity, the new tap coefficients for the next iteration are obtained by adding the tap correction terms $\vec{\Delta}_n$ to the (weighted) tap coefficients of the previous iteration. The weighting mechanism can be characterized by a parameter $\alpha$ (alpha) formulated as follows:

$$\vec{w}_{n+1} = \alpha \cdot \vec{w}_n + \vec{\Delta}_n \qquad \text{Equation (12)}$$

When the receiver diversity is implemented, the joint tap update vector in Equation (9) is simply obtained by substituting the joint weight vector $\vec{w}_{n,jo\,int}$ for $\vec{w}_n$, the joint update vector $\vec{x}_{n,jo\,int}$ for $\vec{x}_n$ and joint tap correction terms $\vec{\Delta}_{n,jo\,int}$ for $\vec{\Delta}_n$ into the standard and no receiver diversity NLMS equation. Equation (9) uses the joint equalizer output and subtracts it from the desired signal or pilot signal to produce joint estimation error. The vector norm square for the input signal is a joint vector norm square. The joint estimation error together with the complex conjugate of input signal, $\mu$ and vector norm square of input signal produces a correction term which is added to the tap-weight vector of the iteration n to produce the tap-weight vector of iteration n+1, the updated tap-weight vector.

Referring still to FIG. 1, the correction term generator 138 may generate the pilot-directed correction terms 140 based on the correction term $$\mu_p \cdot e_p \cdot \frac{X_{ud}}{\|X_{ud}\|^2}$$

which is added, in the equalizer filters 122, 152 to the filter coefficients of the previous iteration to generate updated filter coefficients for the next iteration. The pilot-directed NLMS equalizer 100 outputs an equalized signal 160.

Alternatively, the correction term generator 138 may generate the pilot-directed correction terms 140 based on the correction term $$\mu_P \cdot e_p \cdot \frac{X_{ud}}{\|X_{ud}\|^2 + \varepsilon}.$$

The variable ε is a relatively small number that is used to improve the numerical properties and prevent the fixed-point computation from overflow when the correction terms are generated.

Figure 2:
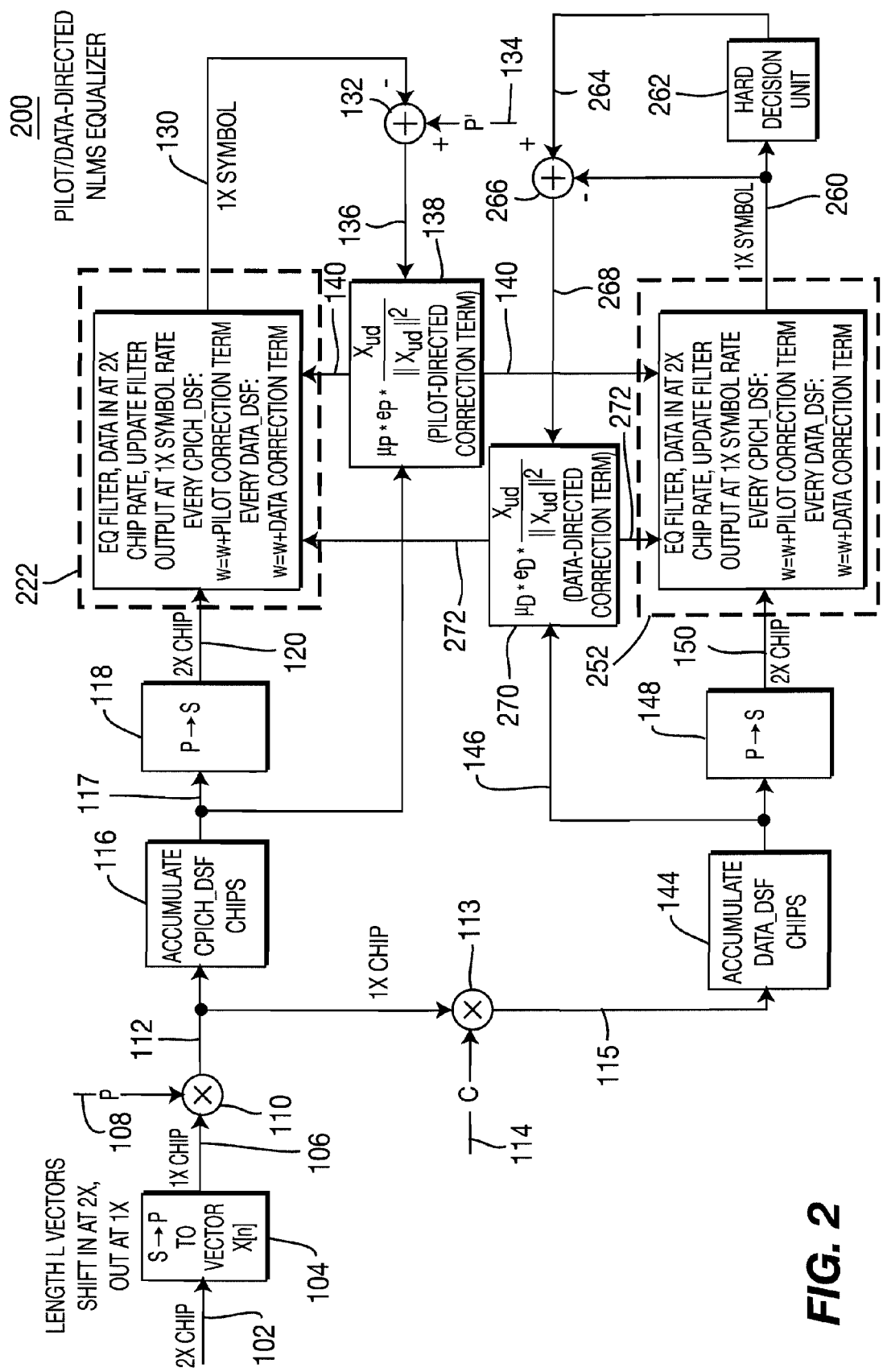
FIG. 2 is a block diagram of a pilot and data-directed equalizer in accordance with another embodiment of the present invention.

FIG. 2 is a block diagram of a pilot and data-directed (i.e., pilot/data-directed) NLMS equalizer 200 in accordance with another embodiment of the present invention. The NLMS equalizer 200 includes an S→P to vector converter 104, multipliers 110, 113, chips accumulators 116, 144, P→S converters 118, 148, equalizer filters 222, 252, summers 132, 266, correction term generators 138, 270, and a hard decision unit 262.

Referring to FIG. 2, a two times (2×) chip rate sample data stream 102 is received by the S→P to vector converter 104. The S→P to vector converter 104 converts the sample data stream 102 to a one times (1×) chip rate converted parallel vectors signal 106 having a length L. The length L converted parallel vectors signal 106 is then multiplied with a scrambling code conjugate signal 108 ("P"), via the multiplier 110, to generate a descrambled parallel vectors signal 112. The descrambled parallel vectors signal 112 is input to the chips accumulator 116 which implements an accumulation operation over the CPICH_DSF chips duration.

The chips accumulator 116 accumulates the descrambled parallel vectors signal 112 to generate an accumulated parallel vectors signal 117 which is input to the P→S converter 118 and the correction term generator 138. The accumulated parallel vectors signal 117 is converted by the P→S converter 118 to an accumulated serial vectors signal 120, which is input to the equalizer filter 222.

The equalizer filter 222 generates an equalized signal 130 based in part on the accumulated serial vectors signal 120. The equalized signal 130 is then subtracted from a pilot symbol reference signal 134 by the summer 132 to generate an error signal 136 which is input to the correction term generator 138. The correction term generator 138 includes a vector norm square estimator (not shown) for generating a vector norm square of the accumulated parallel vectors signal 117 and for generating a pilot-directed correction term 140. The correction term generator 138 generates the pilot-directed correction term 140 based on the error signal 136 and the accumulated parallel vectors signal 117.

For multiple codes reception of data, the multiplier 113, the chips accumulator 144, the P→S converter 148, the equalizer filter 152, the hard decision unit 262, the summer 266 and the correction term generator 270 may need to be run sequentially in serial for all codes. Alternatively, the multiple data processing branches for the multiplier 113, the chips accumulator 144, the P→S converter 148, the equalizer filter 152, the hard decision unit 262, the summer 266 and the correction term generator 270 may also be simultaneously implemented in parallel.

In order for the correction term generator 138 to generate pilot-directed correction terms 140 for tap coefficient updates of the respective equalizers 222, 252, the inputs for $\mu_p$, $e_p$ and $X_{ud}$ are required. $\mu_p$ is the step size. $e_p$ is the error signal which is the differential signal between an equalized signal and a reference signal, which typically is used in the form of a pilot signal. $X_{ud}$ is the received signal after descrambling and despreading. $\|X_{ud}\|$ is the norm of the descrambled and despread signal $X_{ud}$.

The correction term generator 138 may generate the pilot-directed correction terms 140 based on the correction term $$\mu_P \cdot e_p \cdot \frac{X_{ud}}{\|X_{ud}\|^2}$$

which is added, in the equalizer filters 222, 252 to the filter coefficients of the previous iteration to generate updated filter coefficients for the next iteration.

Alternatively, the correction term generator 138 may generate the pilot-directed correction terms 140 based on the correction term $$\mu_P \cdot e_p \cdot \frac{X_{ud}}{\|X_{ud}\|^2 + \varepsilon}.$$

The variable ε is a relatively small number that is used to improve the numerical properties and prevent the fixed-point computation from overflow when the correction term is generated.

Referring still to FIG. 2, the descrambled parallel vectors signal 112 is input to the multiplier 113 which multiplies the descrambled parallel vectors signal 112 with data despreading code ("C") 114 to generate the parallel vectors signal 115. The chips accumulator 144 accumulates the resulting parallel vectors signal 115 to generate a despread descrambled parallel vectors signal 146 which is input to the P→S converter 148 and the correction term generator 270. The despread descrambled parallel vectors signal 146 is converted by the P→S converter 148 to a despread descrambled serial signal 150 which is input to the equalizer filter 252. The equalizer filter 252 generates an equalized signal 260 based in part on the despread descrambled serial vectors signal 150.

The equalizer filter 252 feeds the equalized signal 260 to the hard decision unit 262 and the summer 266. The hard decision 262 demodulates the equalized signal 260 (i.e., it restores the original transmitted signal constellation, for either QPSK, QAM, or the like). The summer 266 subtracts the equalized signal 260 from a hard decision (i.e., data) signal 264 generated by the hard decision unit 262 (or vice versa) to generate an error signal 268 which is input to the correction term generator 270. The correction term generator 270 includes a vector norm square estimator (not shown) for generating a vector norm square of the despread descrambled parallel vectors signal 146 and for generating data-directed correction terms 272 based on the error signal 268 and the despread descrambled parallel vectors signal 146. The data-directed correction terms 272 are updated every data channel symbol duration (i.e., chips equal to data channel DSF). For every CPICH_DSF chip, new pilot-directed tap coefficients 140 are generated using a w=w+pilot correction term or w=alpha×w+pilot_correction_term. Furthermore, for every DATA_DSF chip, new data-directed tap coefficients 272 are generated using a w=w+data correction term or w=alpha×w+data_correction_term. In the case when CPICH_DSF and DATA_DSF are the same, the new equalizer tap coefficients are generated and updated simultaneously for pilot- and data-directed equalization using w=w+pilot_correction_term+data_correction_term or w=alpha×w+pilot_correction_term+data_correction_term.

Each of the equalizer signals 130, 260 are further based on the pilot-directed correction term 140 and the data-directed correction term 272.

In order for the correction term generator 270 to generate data-directed correction terms 272 for tap coefficient updates of the respective equalizers 222, 252, the inputs for $\mu_D$, $e_D$ and $X_{ud}$ are required. $\mu_D$ is the step size. $e_D$ is the error signal which is the differential signal between an equalized signal and a reference signal, which typically is used in the form of a pilot signal. $X_{ud}$ is the received signal 146 after descrambling and despreading. $\|X_{ud}\|$ is the norm of the descrambled and despread signal $X_{ud}$.

The correction term generator 270 may generate the data-directed correction terms 272 based on the correction term $$\mu_D \cdot e_D \cdot \frac{X_{ud}}{\|X_{ud}\|^2}$$

which is added, in the equalizer filters 222, 252, to the filter coefficients of the previous iteration to generate updated filter coefficients for the next iteration.

Alternatively, the correction term generator 270 may generate the data-directed correction terms 272 based on the correction term $$\mu_D \cdot e_D \cdot \frac{X_{ud}}{\|X_{ud}\|^2 + \varepsilon}.$$

The variable $\varepsilon$ is a relatively small number that is used to improve the numerical properties and prevent the fixed-point computation from overflow when the correction term is generated.

A pilot-directed equalizer may be used initially, once the equalizer is stable. A data-directed equalizer may then take over equalizer operations previously performed by the pilot-directed equalizer, whereby the pilot-directed equalizer may then be turned off.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A pilot-directed equalizer for equalizing a sample data stream, the pilot-directed equalizer comprising:
a first accumulator for generating an accumulated parallel vectors signal based on the sample data stream;
a first parallel-to-serial (P→S) converter for converting the accumulated parallel vectors signal to a first accumulated serial vectors signal;
a first equalizer filter for generating a first equalized signal based in part on the first accumulated serial vectors signal;
a summer for generating an error signal by subtracting the first equalized signal from a pilot reference signal; and
a correction term generator for generating a pilot-directed correction term based on the error signal and the accumulated parallel vectors signal, wherein the first equalized signal is generated further based on the pilot-directed correction term.

2. The pilot-directed equalizer of claim 1, further comprising:
a second accumulator for generating an accumulated despread parallel vectors signal based on the sample data stream;
a second P→S converter for converting the accumulated despread parallel vectors signal to a second accumulated serial vectors signal; and
a second equalizer filter for generating a second equalized signal based on the second accumulated serial vectors signal and the pilot-directed correction term.

3. The pilot-directed equalizer of claim 2, further comprising:
a first serial-to-parallel (S→P) to vector converter for receiving the sample data stream, wherein the first S→P to vector converter converts the sample data stream to a converted parallel vectors signal; and
a first multiplier for generating a descrambled parallel vectors signal by multiplying the converted parallel vectors signal with a scrambling code conjugate signal, wherein the first accumulator is configured to accumulate the descrambled parallel vectors signal to generate the accumulated parallel vectors signal.

4. The pilot-directed equalizer of claim 3, wherein the converted parallel vectors signal has a predetermined length.

5. The pilot-directed equalizer of claim 1, wherein the sample data stream is a two times chip rate sample data stream.

6. The pilot-directed equalizer of claim 3, wherein the converted parallel vectors signal is a one times chip rate signal.

7. The pilot-directed equalizer of claim 1, wherein the first accumulated serial vectors signal is a two times chip rate signal.

8. The pilot-directed equalizer of claim 2, wherein the second accumulated serial vectors signal is a two times chip rate signal.

9. The pilot-directed equalizer of claim 1, wherein the first equalized signal is a one times symbol rate signal.

10. The pilot-directed equalizer of claim 2, wherein the second equalized signal is a one times symbol rate signal.

11. A pilot-directed equalization method for equalizing a sample data stream, the pilot-directed equalization method comprising:
generating an accumulated parallel vectors signal based on the sample data stream;
converting the accumulated parallel vectors signal to a first accumulated serial vectors signal;
generating a first equalized signal based in part on the first accumulated serial vectors signal;
generating an error signal by subtracting the first equalized signal from a pilot reference signal; and
generating a pilot-directed correction term based on the error signal and the accumulated parallel vectors signal, wherein the first equalized signal is generated further based on the pilot-directed correction term.

12. The pilot-directed equalization method of claim 11, further comprising:
generating an accumulated despread parallel vectors signal based on the sample data stream;
converting the accumulated despread parallel vectors signal to a second accumulated serial vectors signal; and
generating a second equalized signal based on the second accumulated serial vectors signal and the pilot-directed correction term.

13. The pilot-directed equalization method of claim 12, further comprising:
receiving the sample data stream and converting the sample data stream to a converted parallel vectors signal; and
generating a descrambled parallel vectors signal by multiplying the converted parallel vectors signal with a scrambling code conjugate signal; and
accumulating the descrambled parallel vectors signal to generate the accumulated parallel vectors signal.

14. The pilot-directed equalization method of claim 13, wherein the converted parallel vectors signal has a predetermined length.

15. The pilot-directed equalization method of claim 11, wherein the sample data stream is a two times chip rate sample data stream.

16. The pilot-directed equalization method of claim 13, wherein the converted parallel vectors signal is a one times chip rate signal.

17. The pilot-directed equalization method of claim 11, wherein the first accumulated serial vectors signal is a two times chip rate signal.

18. The pilot-directed equalization method of claim 12, wherein the second accumulated serial vectors signal is a two times chip rate signal.

19. The pilot-directed equalization method of claim 11, wherein the first equalized signal is a one times symbol rate signal.

20. The pilot-directed equalization method of claim 12, wherein the second equalized signal is a one times symbol rate signal.

* * * * *